US009448073B2

(12) United States Patent
Stracke, Jr.

(10) Patent No.: US 9,448,073 B2
(45) Date of Patent: Sep. 20, 2016

(54) SYSTEM AND METHOD FOR ASSESSING ROAD QUALITY USING DATA COLLECTED FROM A MOBILE DEVICE

(71) Applicant: Google Inc., Mountain View, CA (US)

(72) Inventor: John Richard Stracke, Jr., Chelmsford, MA (US)

(73) Assignee: GOOGLE INC., Mountain View, CA (US)

( * ) Notice: Subject to any disclaimer, the term of this patent is extended or adjusted under 35 U.S.C. 154(b) by 639 days.

(21) Appl. No.: 13/913,736

(22) Filed: Jun. 10, 2013

(65) Prior Publication Data

US 2015/0184348 A1 Jul. 2, 2015

(51) Int. Cl.
*E01C 23/01* (2006.01)
*G01P 15/00* (2006.01)
*G01C 21/20* (2006.01)
*G01C 21/28* (2006.01)

(52) U.S. Cl.
CPC ............... *G01C 21/20* (2013.01); *G01C 21/28* (2013.01); *G01P 15/00* (2013.01)

(58) Field of Classification Search
CPC ....... E01C 23/01; G01C 21/20; G01C 21/28; G01P 15/00
USPC ......... 702/34, 75, 93, 94, 96, 141, 142, 149, 702/150; 455/550.1; 701/31.4, 123
See application file for complete search history.

(56) References Cited

U.S. PATENT DOCUMENTS 6,487,477 B1 11/2002 Woestman et al.
7,512,487 B1 3/2009 Golding et al.
7,680,749 B1 3/2010 Golding et al.
7,778,769 B2 8/2010 Boss et al.
7,865,298 B2 1/2011 Macneille et al.
7,925,426 B2 4/2011 Koebler et al.

(Continued)

FOREIGN PATENT DOCUMENTS

JP 2009-031046 A 2/2009
JP 2009-250930 A 10/2009

OTHER PUBLICATIONS

Ericksson et al., "The Pothole Patrol: Using a Mobile Sensor Network for Road Surface Monitoring", 6$^{th}$ Annual International Conference on Mobile Systems, Applications and Services, Jun. 17-20, 2008, Breckenridge, Colorado—11 pages.

(Continued)

*Primary Examiner* — John H Le
(74) *Attorney, Agent, or Firm* — Marshall, Gerstein & Borun LLP

(57) ABSTRACT

A computer implemented method for assessing road quality using data collected from a mobile device is disclosed. The method may include obtaining travel data associated with a mobile device traversal. The travel data may include acceleration data associated with the mobile device during the mobile device traversal. The method may also include analyzing the travel data according to one or more heuristics. Each heuristic may provide a heuristic metric indicative of whether the mobile device traversal is a human-carried mobile device traversal. In addition, the method may include determining a confidence score for the travel data based on the heuristic metric provided by each of the one or more heuristics and processing the travel data based at least in part on the confidence score, wherein the processed travel data is configured to be used to assess road quality.

20 Claims, 4 Drawing Sheets

SERVER DEVICE
CLIENT DEVICE
100
102 COLLECT TRAVEL DATA
104 ANALYZE TRAVEL DATA ACCORDING TO ONE OR MORE HEURISTICS
106 DETERMINE CONFIDENCE SCORE BASED ON HEURISTIC METRICS
108 TRANSMIT TRAVEL DATA
110 RECEIVE TRAVEL DATA
112 ASSESS ROAD QUALITY BASED ON TRAVEL DATA RECEIVED
114 SHARE LOCATIONS OF IDENTIFIED ROAD SURFACE ANOMALIES

(56) References Cited

U.S. PATENT DOCUMENTS

| | | | |
|---|---|---|---|
| 8,589,063 B2 | 11/2013 | Trum | |
| 8,682,399 B2 * | 3/2014 | Rabu | G01C 21/20 455/550.1 |
| 2007/0027593 A1 | 2/2007 | Shah et al. | |
| 2007/0109119 A1 | 5/2007 | Zhang et al. | |
| 2007/0150171 A1 | 6/2007 | Tengler et al. | |
| 2008/0030370 A1 | 2/2008 | Doyle | |
| 2008/0086266 A1 | 4/2008 | Howard et al. | |
| 2008/0177436 A1 | 7/2008 | Fortson | |
| 2008/0275644 A1 | 11/2008 | Macneille et al. | |
| 2009/0084173 A1 | 4/2009 | Gudat et al. | |
| 2009/0099724 A1 | 4/2009 | Kranz et al. | |
| 2009/0299558 A1 | 12/2009 | Hidaka | |
| 2010/0121514 A1 | 5/2010 | Kato et al. | |
| 2010/0138142 A1 | 6/2010 | Pease | |
| 2010/0332113 A1 | 12/2010 | Tengler et al. | |
| 2011/0060517 A1 | 3/2011 | Kono et al. | |
| 2011/0112764 A1 | 5/2011 | Trum | |
| 2011/0137508 A1 | 6/2011 | Garcia Manchado | |
| 2011/0160990 A1 | 6/2011 | Mineta | |
| 2011/0251782 A1 | 10/2011 | Perkins et al. | |
| 2012/0004839 A1 | 1/2012 | Mizuno et al. | |
| 2012/0053805 A1 | 3/2012 | Dantu | |
| 2012/0053825 A1 | 3/2012 | Schunder | |
| 2012/0063825 A1 | 3/2012 | Hasegawa et al. | |
| 2012/0089327 A1 | 4/2012 | Miura et al. | |
| 2012/0173121 A1 | 7/2012 | Willard | |
| 2012/0197517 A1 | 8/2012 | Sengoku et al. | |
| 2012/0203449 A1 | 8/2012 | Sengoku et al. | |
| 2012/0221234 A1 | 8/2012 | Sujan et al. | |
| 2012/0226435 A1 | 9/2012 | Yuasa | |
| 2012/0277987 A1 | 11/2012 | Marumoto | |
| 2012/0303254 A1 | 11/2012 | Kirsch et al. | |
| 2013/0046458 A1 | 2/2013 | Dufournier | |
| 2013/0090790 A1 | 4/2013 | Yuen et al. | |
| 2013/0090821 A1 | 4/2013 | Abboud et al. | |
| 2013/0231841 A1 | 9/2013 | Rothschild | |
| 2014/0330526 A1 * | 11/2014 | Allen | E01B 35/06 702/34 |

OTHER PUBLICATIONS

Mednis et al., "Real Time Pothole Detection Using Android Smartphones with Accelerometers", 2011 International Conference on Distributed Computing in Sensor Systems and Workshops, Jun. 27-29, 2011, Barcelona, Spain—6 pages.

U.S. Appl. No. 13/362,013, filed Jan. 31, 2012.

U.S. Appl. No. 13/433,996, filed Mar. 29, 2012.

* cited by examiner

SYSTEM AND METHOD FOR ASSESSING ROAD QUALITY USING DATA COLLECTED FROM A MOBILE DEVICE

FIELD

The present subject matter relates generally to the use of data collected from a mobile device to assess the road quality of one or more roads and, more particularly, to a system and method for analyzing such data to determine if it was collected while the mobile device was traveling within a vehicle or being carried by a person (e.g., while the person was walking or running).

BACKGROUND

It is well-known to use computer-based mapping systems to provide travel directions to users. For example, Google Maps for Mobile allows mobile devices, such as smart phones, tablets, and PDAs, to display maps and directions in response to user requests. Specifically, a user may request travel directions by inputting an origin (e.g., the user's current location) and a desired travel destination into his/her mobile device. The device may then receive and/or generate suggested routing information based on the origin and destination information and provide such routing information to the user, such as by mapping the suggested route onto a display screen of the device.

In many parts of the world, road quality varies greatly. Thus, when selecting a driving route, it is important to know the quality of a particular road or road network. For example, it would be advantageous to know whether particular roads along a given driving route are well-paved highway roads or rutted dirt roads. Such information is particularly important for travelers, who do not have local knowledge of the area being visited, and for emergency service personnel, for whom road choice may be a matter of life and death for their patients.

SUMMARY

Aspects and advantages of the invention will be set forth in part in the following description, or may be obvious from the description, or may be learned through practice of the invention.

In one aspect, the present subject matter is directed to a computer implemented method for assessing road quality using data collected from a mobile device. The method may include obtaining travel data associated with a mobile device traversal. The travel data may include acceleration data associated with the mobile device during the mobile device traversal. The method may also include analyzing the travel data according to one or more heuristics. Each heuristic may provide a heuristic metric indicative of whether the mobile device traversal is a human-carried mobile device traversal. In addition, the method may include determining a confidence score for the travel data based on the heuristic metric provided by each of the one or more heuristics and processing the travel data based at least in part on the confidence score, wherein the processed travel data is configured to be used to assess road quality.

In another aspect, the present subject matter is directed to a system for assessing road quality using data collected from a mobile device. The system may include a computing device having a processor and memory. The memory may store instructions that, when executed by the processor, configure the computing device to obtain travel data associated with a mobile device traversal. The travel data may include acceleration data associated with the mobile device during the mobile device traversal. The computing device may also be configured to analyze the travel data according to one or more heuristics. Each heuristic may provide a heuristic metric indicative of whether the mobile device traversal is a human-carried mobile device traversal. In addition, the computing device may be configured to determine a confidence score for the travel data based on the heuristic metric provided by each of the one or more heuristics and process the travel data based at least in part on the confidence score, wherein the processed travel data is configured to be used to assess road quality.

Other exemplary aspects of the present subject matter are directed to apparatus, computer-readable media, devices and other systems and/or methods for assessing road quality using data collected by a mobile device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
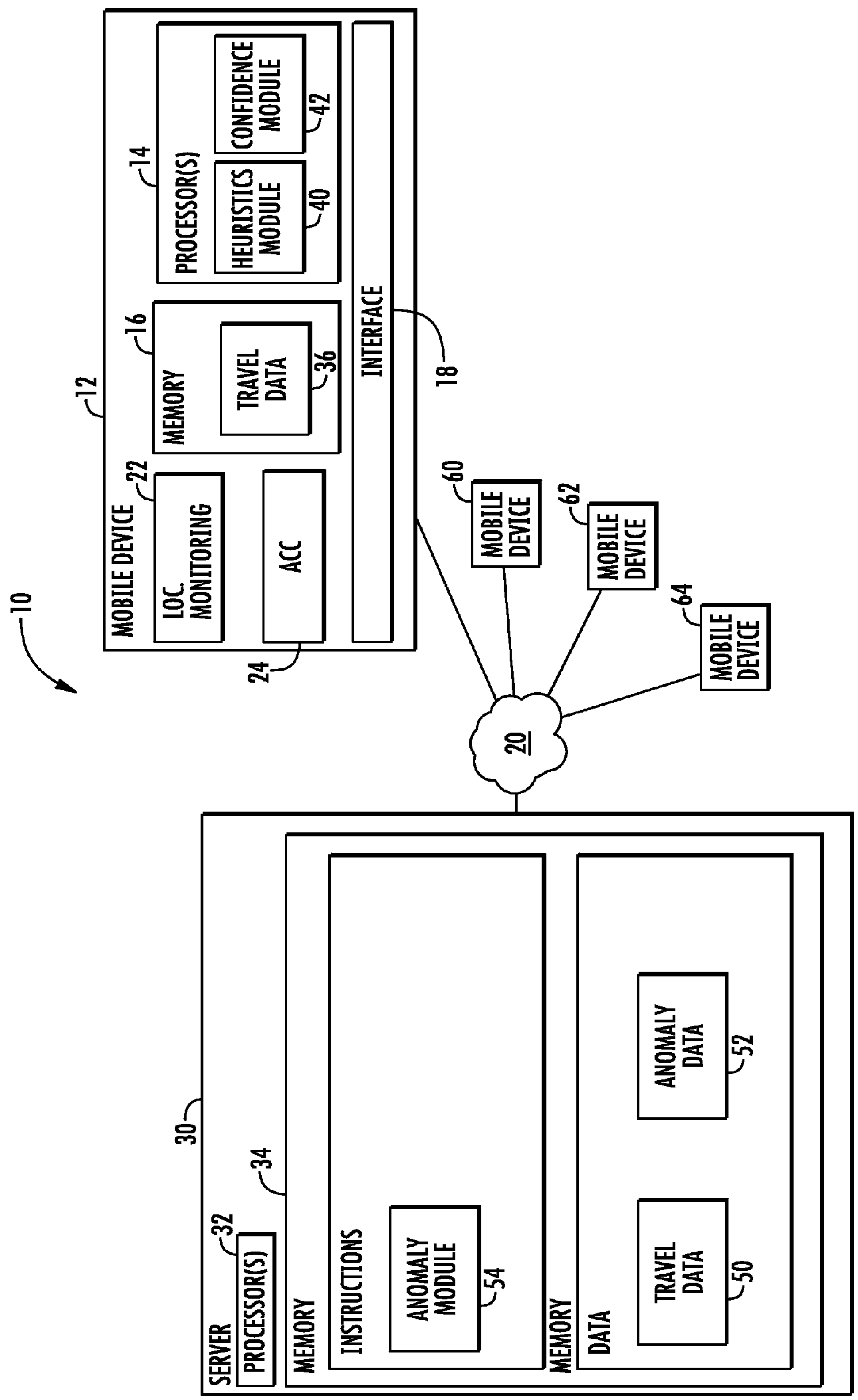
FIG. 1 illustrates a schematic view of one embodiment of a computer-based system for assessing road quality using data collected by a mobile device.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for assessing the road quality of one or more roads. In several embodiments, acceleration data may be collected from a mobile device traveling within a vehicle. This acceleration data may be analyzed to identify acceleration transients, which may be indicative of a road surface anomaly. For instance, a vehicle typically experiences a quick, temporary change in travel direction when travelling over a road surface anomaly, such as a rut, pothole, bump, rumble strips, etc. This change in travel direction results in an acceleration transient in the new direction that is capable of being detected by a mobile device traveling within the vehicle. The acceleration data collected by the mobile device may then be combined with the position data provided by the device's location-enabled components to identify the exact location at which the acceleration transient was experienced and, thus, the exact location of the road surface anomaly. By collecting such data from a plurality of mobile devices (e.g., using crowdsourcing methodologies), road surface anomalies may be identified and mapped over a large road network. This anomaly data may then be made available to users of, for example, a mapping or other geographic information system (GIS) application to identify rough locations or sections of a road. For example, a user may be provided the option of selecting the "smoothest" driving route to a given travel destination (e.g., the route with the least amount of identified road surface anomalies). In addition, information associated with upcoming road surface anomalies may be presented to the user so that he/she may avoid the anomalies or otherwise adjust his/her driving parameters (e.g., by slowing down when approaching an identified road surface anomaly).

When collecting the acceleration data from the mobile devices, it may be desirable to filter out or ignore data that is not collected when such devices are traveling within a vehicle. Specifically, when a person is carrying a mobile device, acceleration transients may be detected by the device due to the fact that the person is walking/running or otherwise moving their device around. Accordingly, in several embodiments of the present subject matter, the disclosed system and method may also be configured to analyze one or more parameters or heuristics to determine whether a mobile device is being carried by a vehicle or a person, thereby allowing human-derived acceleration transients (e.g., due to running or walking) to be distinguished from the acceleration transients experienced by a vehicle when traveling over a road surface anomaly. For instance, as will be described below, one or more heuristics, such as a speed heuristic, an endurance heuristic, a frequency heuristic, an acceleration heuristic and/or the like, may be used that provide a strong indication of whether a mobile device is carried by a vehicle or a person. Such heuristic(s) may then be analyzed to assign a confidence level or score to a given set of acceleration data collected by a mobile device. If the confidence score is relatively high (thereby indicating a high likelihood that the mobile device was traveling within a vehicle when the data was collected), the acceleration data may be used as a basis for assessing the road quality of a road(s). Alternatively, if the confidence score is relatively low (thereby indicating a high likelihood that the mobile device was being carried by a person when the data was collected), the acceleration data may be discarded or, at the very least, given a significantly lower weight assessing the road quality.

Referring now to the drawings, FIG. 1 illustrates a schematic view of one embodiment of a system 10 for assessing road quality using data collected from a mobile device in accordance with aspects of the present subject matter. As shown, the system 10 may include a mobile device 12. In several embodiments, the mobile device 12 may be a processor-based, portable computing device, such as a mobile phone (including a smart phone), a personal digital assistant, a tablet, a laptop and/or any other suitable portable computing device.

The mobile device 12 may include a processor(s) 14 and a memory 16. The processor(s) 14 may be any known processing device. The memory 16 may include any suitable computer-readable medium or media, including, but not limited to, RAM, ROM, hard drives, flash drives, or other memory devices. The memory 16 may store information accessible by the processor(s) 14, including instructions that can be executed by the processor(s) 14. The instructions can be any set of instructions that, when executed by the processor(s) 14, cause the processor(s) 14 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

The memory 16 may also include data that may be retrieved, manipulated, or stored by the processor(s) 14. In several embodiments, the memory 16 may include or be coupled to various databases containing information to permit the mobile device 12 to perform various functions. For instance, as shown in FIG. 1, the memory 16 may include a travel database 36 storing travel data collected by the mobile device 12. In general, the travel data may correspond to any suitable data collected by the mobile device 12 that relates to its movement during a mobile device traversal, such as position and acceleration data associated with the movement of the device 12 during the mobile device traversal. It should be appreciated that, as used herein, the term "mobile device traversal" refers to any route or path across which a mobile device is moved, including when the device is traveling within a vehicle and when the device is being carried by a person (e.g., when the person is walking or running). As will be discussed in further detail below, the travel data stored within the memory 16 may be used to identify when the data is associated with a vehicle-related mobile device traversal or a human-carried mobile device traversal. If it is determined that the travel data was collected during a vehicle-related mobile device traversal, the data may then be used to assess the road quality of the road(s) along which the mobile device traveled (e.g., by identifying road surface anomalies in the road(s)).

Additionally, the mobile device 12 may include a network interface 18 for accessing information over a network 20. The network 20 may include a combination of networks, such as cellular network, Wi-Fi network, LAN, WAN, the Internet, and/or other suitable network and can include any number of wired or wireless communication links. For instance, the mobile device 12 may communicate through a cellular network using a WAP standard or other appropriate communication protocol. The cellular network may in turn communicate with the Internet, either directly or through another network.

The mobile device 12 may also be location-enabled and, thus, may include a location monitoring component 22 for generating position data associated with the device 12. The position data may include, for example, information related to the geographic location of the mobile device 12 at any given time (e.g., time-stamped geographic coordinates). The position data may also include information associated with the change in location of the mobile device 12 over time (i.e., the speed of the mobile device). For instance, the location monitoring component 22 may generate data associated with the current location of the mobile device 12 at a given frequency (e.g., every second, every 5 seconds, every 30 seconds, etc.). The change in location of the device 12 over time may then be analyzed to determine its speed.

In one embodiment, the location monitoring component 22 may be a GPS module or sensor configured to determine position data for the mobile device 12 based on signals received from one or more satellites. In another embodiment, the location monitoring component 22 may be a location module or sensor configured to determine position data for the device 12 based on signals received from one or more cell phone towers and/or one or more WiFi access points. Alternatively, the location monitoring component 22 may be any other suitable module, sensor and/or component that is capable of monitoring the location and/or speed of the mobile device 12.

The mobile device 12 may also include an accelerometer 24 configured to provide acceleration data associated with the device 12. Specifically, the accelerometer 24 may be configured to monitor the acceleration of the device 12 as it being moved (i.e., during a mobile device traversal). As will be described below, such acceleration data may be utilized to assess the road quality of a particularly road(s). For example, the accelerometer data may be analyzed to detect transients in the acceleration of the device 12, which may be indicative of a road surface anomaly. Specifically, as indicated above, when a vehicle travels over a road surface anomaly (e.g., a rut, pothole, bump, rumble strips, etc.), the vehicle experiences a temporary, quick change in travel direction, which results in a transient acceleration of the vehicle and its occupants in the new direction. Thus, assuming that the mobile device 12 is within the vehicle, the transient acceleration may be detected by the accelerometer 24 and stored within the memory 14. This acceleration data may then be combined with the position data provided by the location monitoring component 22 to identify the locations of road surface anomalies along a given road and/or road network.

As indicated above, the memory 16 of the mobile device 12 may store instructions that can be executed by processor (s) 14. In several embodiments, the instructions may be executed by the processor(s) 14 to implement a heuristics module 40 and a confidence module 42. The heuristics and confidence modules 40, 42 may be configured to analyze the travel data 36 collected by the mobile device 12 (e.g., position and/or acceleration data) to determine whether the data was collected during a vehicle-related mobile device traversal or a human-carried mobile device traversal. For instance, as will be described below, the heuristics module 40 may be configured to utilize one or more heuristics to analyze the position and/or acceleration data. By analyzing such data, each heuristic may provide a heuristic metric indicative of whether the mobile device 12 was being carried by a vehicle or a person. The heuristic metric(s) may then be input into the confidence module 42 so that a confidence score may be assigned to the data. For example, when more than one heuristic metric is provided, the heuristic metrics may be combined using fuzzy logic to provide an overall confidence score related to the likelihood that the data was collected during a vehicle-related mobile device traversal or a human-carried mobile device traversal. The data may then be used or discarded based on the confidence score. For instance, in one embodiment, the confidence score may be compared to a predetermined confidence threshold. In such an embodiment, the data may be used if the confidence score is equal to or exceeds the threshold and discarded if the confidence score falls below the threshold. Alternatively, the data may simply be weighted according to its confidence score.

It should be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

It should also be appreciated that the mobile device 12 may also include various other components, such as any suitable components typically included within a conventional mobile device. For example, the mobile device 12 may include a display (not shown) for presenting user interfaces to a user of the device 12.

Moreover, as shown in FIG. 1, the mobile device 12 may also be configured to communicate with another computing device 30 over the network 20. In several embodiments, the computing device 30 may be a server, such as a web server, that provides information to a plurality of client computing devices (e.g., mobile devices 12, 60, 62, 64) over the network 20. For example, the computing device 30 may receive a request from the mobile device 12 and locate information to return to the device 12 that is responsive to the request. The computing device 30 may take any applicable form, and may, for instance, include a system that provides search and/or mapping services, such as the services provided by Google Inc.

Figure 2:
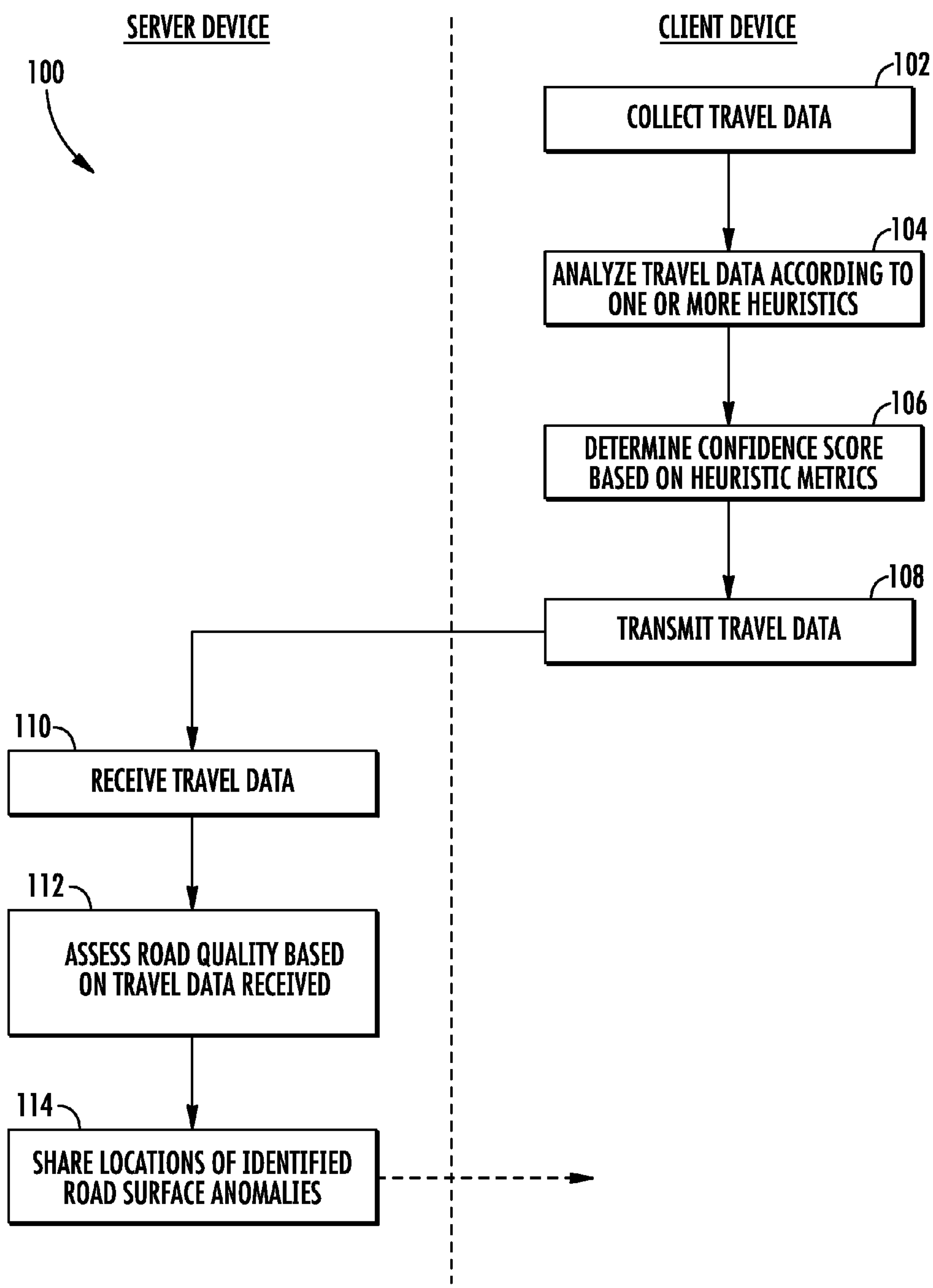
FIG. 2 illustrates a server-client flow diagram of one embodiment of a method for assessing road quality using data collected by a mobile device.

Similar to the mobile device 12, the computing device 30 may include a processor(s) 32 and a memory 34. The processor(s) 32 may be any known processing device. The memory 34 may include any suitable computer-readable medium or media, including, but not limited to, RAM, ROM, hard drives, flash drives, or other memory devices. As shown in FIG. 2, the memory 34 may include data that may be retrieved, manipulated, created and/or stored by the processor(s) 32. Specifically, the memory 34 may include or be coupled to various databases containing information to permit the computing device 30 to perform various functions. For instance, as shown in FIG. 1, the memory 34 may include a travel database 50 storing travel data received from one or more mobile devices. As indicated above, the travel data may include both position data (e.g., time-stamped, geographic coordinates) and acceleration data generated by the location monitoring component 22 and the accelerometer 24, respectively, of a mobile device. The memory 34 may also include an anomaly database 52 storing anomaly data associated with the road surface anomalies identified by the computing device 30 using the travel data. For instance, the anomaly data may correspond to geographic coordinates and/or other position information related to the location of each identified surface anomaly.

The memory may also store instructions that can be executed by processor(s) 32. The instructions can be any set of instructions that, when executed by the processor(s) 32, cause the processor(s) 32 to provide desired functionality. For instance, the instructions may be executed by the processor(s) 32 to implement an anomaly module 54. The anomaly module 54 may be configured to analyze the travel data to identify road surface anomalies based on acceleration transients detected by the mobile device(s). Such an analysis may include, for example, identifying and storing the location of each road surface anomaly. In addition, the analysis may include assessing the severity of a road surface anomaly by identifying the magnitude of the acceleration transient.

Referring now to FIG. 2, a client-server flow diagram of one embodiment of a method 100 for assessing road quality using data collected from a mobile device is illustrated in accordance with aspects of the present subject matter. The method 100 will generally be discussed herein with reference to the system 10 shown in FIG. 1. However, those of ordinary skill in the art, using the disclosures provided herein, should appreciate that the methods described herein may be executed by any computing device or any combination of computing devices. For instance, instead of the heuristics and confidence modules 40, 42 being implemented on the client side, such modules may be implemented entirely on the server side. In such an embodiment, the client device(s) may simply be configured to collect and transmit the travel data, with the data being subsequently processed/analyzed by the server device(s). Additionally, it should be appreciated that, although the method elements 102-114 are shown in FIG. 2 in a specific order, the various elements of the disclosed method 100 may generally be performed in any suitable order that is consistent with the disclosure provided herein.

As shown in FIG. 2, at 102, travel data may be collected by a client device, such as the mobile device 12, during a mobile device traversal. As described above, the travel data may include, for example, both position data and acceleration data associated with the movement of the client device. For instance, position data may be generated by the location monitoring component 22 of a client device that is associated with the location and/or speed of the device during the mobile device traversal. Similarly, acceleration data may be generated by the accelerometer 24 of a client device that is associated with the acceleration of the device during the mobile device traversal.

Figure 3:
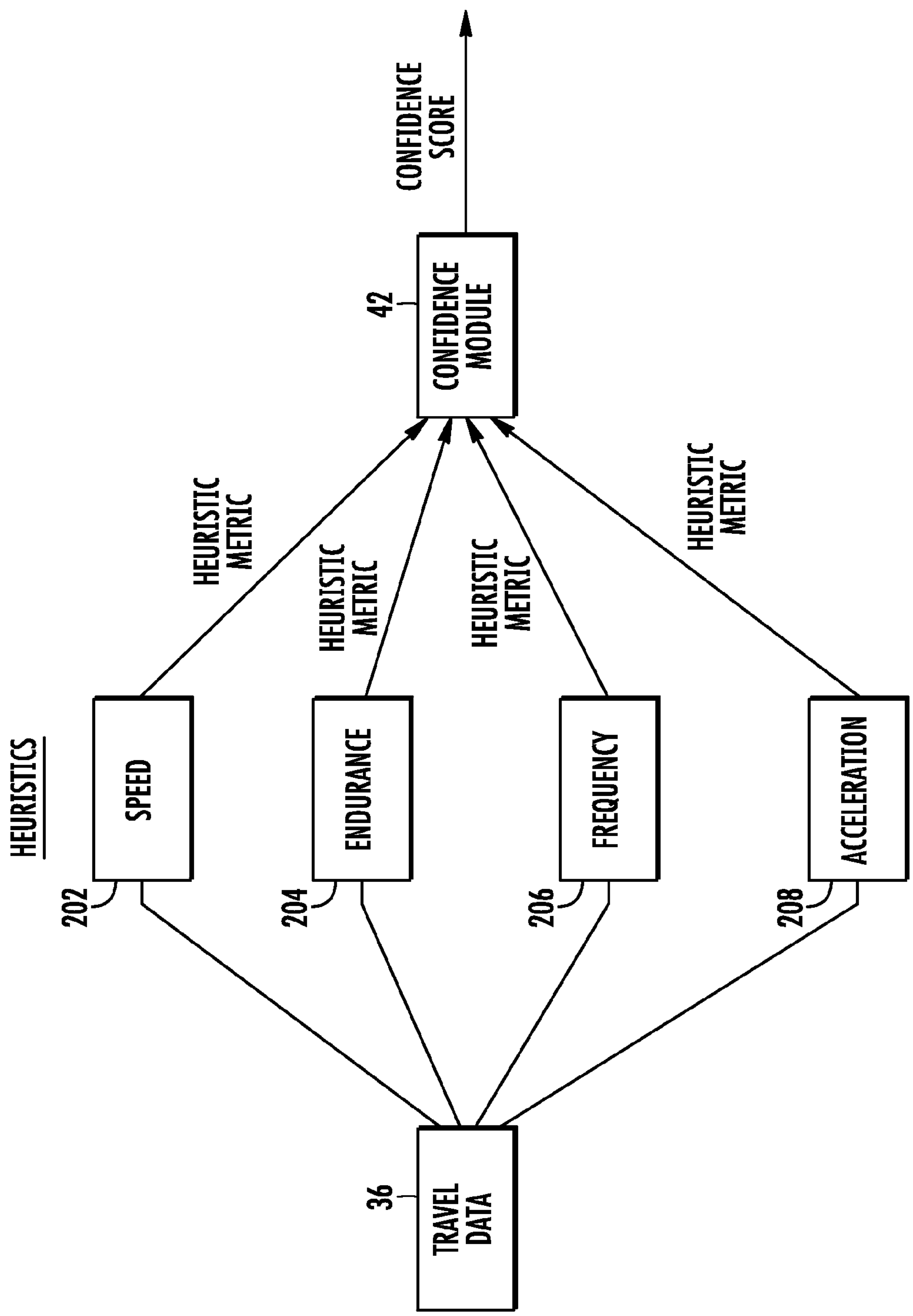
FIG. 3 illustrates a schematic, flow diagram of various heuristics that may be applied to travel data collected by a mobile device to provide heuristic metrics that can be used in determining a confidence score for the travel data.

At 104, the travel data may be analyzed according to one or more heuristics. For example, FIG. 3 illustrates a simplified flow diagram showing various heuristics that may be utilized by the client device to analyze the travel data. As shown, in several embodiments, any combination of a speed heuristic 202, an endurance heuristic 204, a frequency heuristic 206 and an acceleration heuristic 208 may be used to analyze the travel data. Each heuristic may produce a heuristic metric that provides an indication of whether the data was collected during a vehicle-related mobile device traversal or a human-carried mobile device traversal, which may then be input into the confidence module 42 to determine a confidence score based on the heuristic metrics.

The speed heuristic may provide a heuristic metric indicating that likelihood that the travel data was collected during a vehicle-related mobile device traversal or a human-carried mobile device traversal based on the speed of the client device. Specifically, it may be assumed that a human is not capable of running at a speed above a certain speed threshold (e.g., above 25 MPH). Thus, if the speed of the client device (as determined using the position data provided by its location monitoring component 22) is greater than the speed threshold, the heuristic metric provided by the speed heuristic may indicate with certainty that the travel data was obtained during a vehicle-related mobile device traversal. However, at speeds below such threshold, the heuristic metric may be varied to account for the fact that the travel data may have been obtained while a person was walking/running with their client device.

Figure 4:
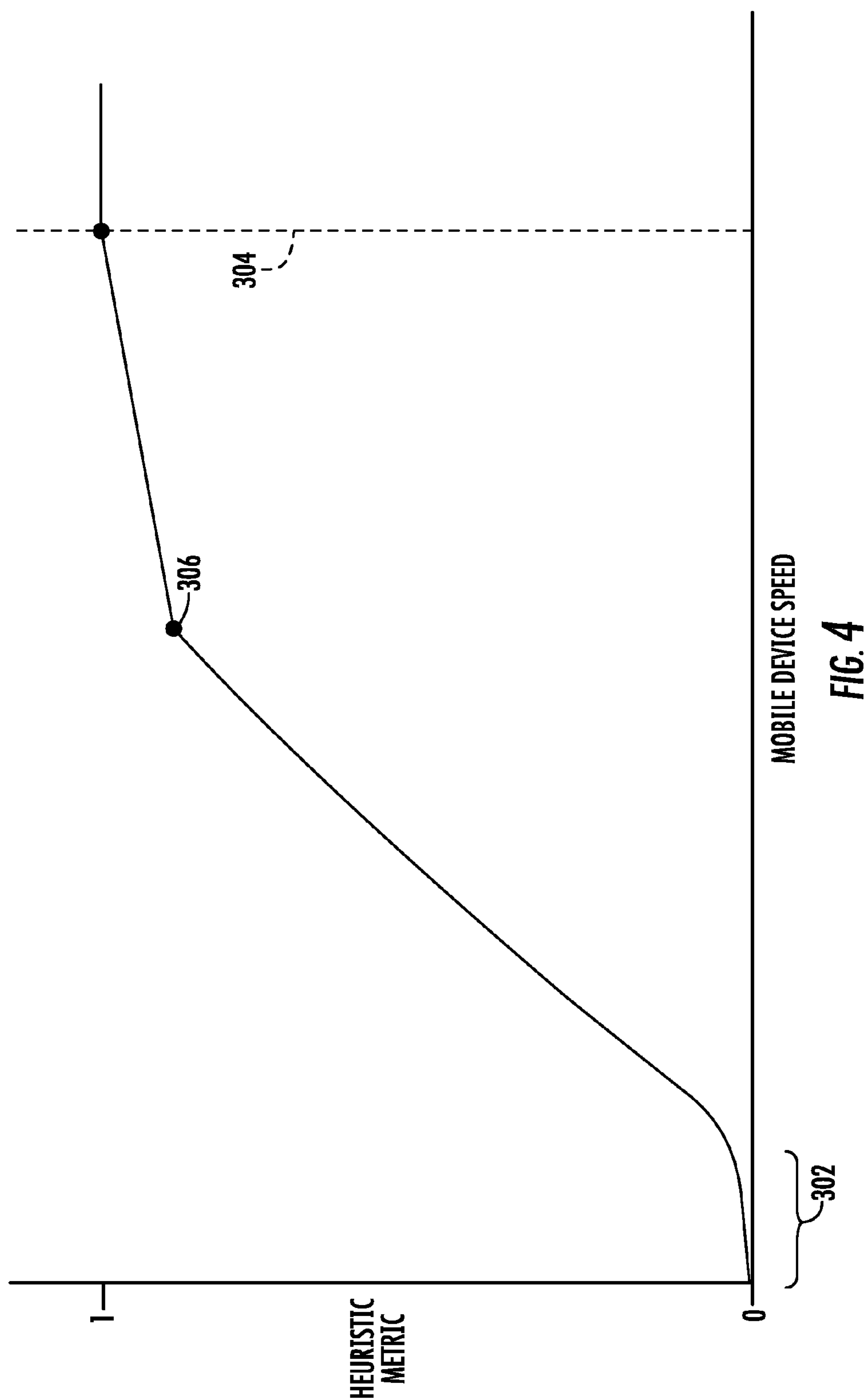
FIG. 4 illustrates an example graph showing how a heuristic metric may be varied with speed, particularly illustrating the heuristic metric varying according to a monotonically increasing function.

For instance, FIG. 4 illustrates a graph providing one example of how the heuristic metric may be varied with differing travel speeds. As shown, the heuristic metric ranges from zero to one according to a monotonically increasing function. Specifically, at a lower speed range 302 (e.g., below 3 MPH), the heuristic metric may be at or around zero, thereby indicating that is likely that the client device was being carried by a person. However, as the speed is increased towards the speed threshold (indicated by line 304), the heuristic metric approaches one, thereby indicating the increased likelihood that the client device was traveling within a vehicle. For example, as shown in FIG. 4, the heuristic metric rapidly increases to a value close to one at an intermediate speed threshold (e.g., the speed at point 306) and then slowly increases to one at the speed threshold 304. In such instance, the intermediate speed threshold may correspond to a speed at which, although possible, it is highly unlikely that the client device is being carried by a person (e.g., at about 15 MPH).

It should be appreciated that the graph shown in FIG. 4 is simply illustrated to provide one example of how the heuristic metric for the speed heuristic may be varied with speed. Thus, one of skill in the art should readily understand that any other suitable curve may be used to define the relationship between the heuristic metric and speed. For instance, in another embodiment, any other suitable monotonically increasing function may be used to define the relationship between the heuristic metric and speed.

Referring back to FIG. 3, the endurance heuristic may provide a heuristic metric indicating that likelihood that the travel data was collected during a vehicle-related mobile device traversal or a human-carried mobile device traversal based on the length of time at which the client device was maintained at or above a given speed. Specifically, it may be assumed that there is a time limit regarding how long a human is capable of traveling at a given speed, which may be based, for example, on current endurance records. For instance, if the world endurance record for running at speed S is T minutes, it can be assumed that the travel data was not collected during a human-carried mobile device traversal if the speed of the device is maintained at speed S for a time period equal to k*T (where k is an empirically chosen constant, such as 1.2). To address instances at which the speed of the device is maintained at speed S for a time period less than k*T, a suitable set of curves may be developed for each speed that varies the endurance heuristic metric across different time periods. For instance, similar to the curve shown in FIG. 4 for the speed heuristic metric, the endurance heuristic metric may be defined by a curve that is at or close to zero for shorter time periods (e.g., time periods less than T/k), at or close to one for longer time periods (e.g., time periods greater than k*T) and increased monotonically therebetween.

The frequency heuristic may provide a heuristic metric indicating that likelihood that the travel data was collected during a vehicle-related mobile device traversal or a human-carried mobile device traversal based on the frequency at which acceleration transients are detected by the client device. Specifically, a person walking or running at a given speed is typically stepping at a regular rate, which means that the accelerometer of the client device would detect acceleration transients at a relatively constant frequency. Accordingly, if the acceleration transients are occurring at irregular intervals, it may be more likely that the client device is traveling within a vehicle and, thus, the acceleration transients are due to road surface anomalies. Similar to the speed and endurance thresholds, a suitable function may be developed that varies the frequency heuristic metric based on the frequency of the acceleration transients. For instance, in one embodiment, the heuristic metric may be calculated by measuring the frequency or time variance TV between acceleration transients and dividing such time variance TV by the mean time variance M for the acceleration data (to normalize the data). Thereafter, a monotonic function f(TV/M) may be applied for the heuristic metric such that f(0) is equal to zero, f(x) is equal to one when x is a value greater than a predetermined frequency threshold and f(x) increases as the value for x increases from zero to the predetermined frequency threshold.

The acceleration heuristic may provide a heuristic metric indicating that likelihood that the travel data was collected during a vehicle-related mobile device traversal or a human-carried mobile device traversal based on the acceleration of the client device. Specifically, it may be assumed that a human is not capable of accelerating at a speed above a certain acceleration threshold (e.g., above 1.5 $m/s^2$). Thus, if the acceleration of the client device is greater than the acceleration threshold, the heuristic metric provided by the acceleration heuristic may indicate with certainty that the travel data was obtained during a vehicle-related mobile device traversal. However, at accelerations below such threshold, the heuristic metric may be varied to account for the fact that the travel data may have been obtained while a person was walking/running with their device. For example, similar to the heuristic metrics described above, the acceleration heuristic metric may be varied using a suitable function (e.g., monotonic function) such that the heuristic metric is at or close to zero for low accelerations, at or close to one at the acceleration threshold and increases therebetween.

It should be appreciated that, in alternative embodiments, any other suitable heuristic(s) and/or combination of heuristics may be utilized to provide an indication of whether the travel data was collected during a vehicle-related mobile device traversal or a human-carried mobile device traversal. For example, an application-related heuristic may be utilized to provide a heuristic metric based on whether a user is using his/her client device for turn-by-turn navigation directions. Typically, the user must input into a navigation application whether he/she is walking or driving. In such instance, the user's input may be treated as reliable and utilized to assign a heuristic metric to the data. Similarly, an application-related heuristic may be utilized to provide a heuristic metric based on whether a user is currently using an application that requires movement of his/her client device. For example, gaming and other applications often require a user to shake or continuously tilt/move his/her client device. Thus, if it is determined that an application is running on the client device that requires data from the accelerometer, the heuristic metric for the travel data may be set very low or the data may be discarded as being unreliable.

It should also be appreciated that that, instead of having a variable heuristic metric for each heuristic (e.g., by varying the metric between zero and one), the heuristic metric may simply correspond to a true/false metric. For instance, heuristics providing a true output may be assigned a heuristic metric of one while heuristics providing a false output may be assigned a heuristic metric of zero.

Referring back to FIG. 2, at 106, a confidence score for the travel data may be determined based on the heuristic metrics. Specifically, the heuristic metrics determined at 104 may be combined and/or analyzed to produce an overall confidence score for the travel data that provides a final indicator of whether the data was collected during a vehicle-related mobile device traversal or a human-carried mobile device traversal. In general, the heuristic metrics may be combined and/or analyzed using any suitable algorithm and/or methodology known in the art. However, in several embodiments, the heuristic metrics may be combined and/or analyzed using fuzzy logic. Specifically, in one embodiment, each heuristic metric may be multiplied by a confidence factor or weight corresponding to the expected or anticipated accuracy of the metric. For example, it may be determined that the speed heuristic metric typically provides a more accurate representation of whether travel data was collected during a vehicle-related device traversal or a human-carried mobile device traversal than the acceleration heuristic metric. In such instance, the weight applied to the speed heuristic metric may be greater than the weight applied to the acceleration heuristic metric. After multiplying each heuristic metric by its corresponding weight, the resulting values may be summed to determine the overall confidence score for the travel data.

As indicated above, the manner in which the calculated confidence score is used may vary. For instance, in one embodiment, the confidence score may be compared to a predetermined confidence threshold. In such an embodiment, if the confidence score is equal to or exceeds the threshold, it may be determined that the travel data was collected during a vehicle-related mobile device traversal and, thus, the data may be used as a basis for assessing the road quality of a road(s). However, if the confidence score falls below the threshold, it may be determined that the travel data was collected during a human-carried mobile device traversal and, thus, the data may be discarded. In another embodiment, the travel data may be weighted according to its confidence score. For instance, the travel data associated with a high confidence score may be given a higher weight and, thus, may provide a greater contribution to the identification of road surface anomalies than the travel data associated with a lower confidence score.

At 108 and 110, travel data may be transmitted from the client device over a network (e.g., network 20) and subsequently received by a server device, such as the computing device 30. As indicated above, in several embodiments, the travel data may be filtered by the client device based on the confidence score assigned to the data. In such embodiments, the travel data transmitted to and received by the server device may only correspond to the travel data having a confidence score that exceeds the predetermined confidence threshold. Alternatively, in embodiments in which the travel data is simply weighted according to its confidence score, all of the travel data collected by the client device, along with its corresponding weight(s), may be transmitted to and received by the server device.

It should be appreciated that, given that it may often be expensive to transmit the data across certain networks (e.g., due to data limits on a cellular network) and/or due to the fact that the data set may be rather large, the client device may, in one embodiment, only be configured to transmit travel data when it is connected to specified networks (e.g., a WiFi network) and/or after certain criteria are met (e.g., when the amount of travel data exceeds a given storage threshold).

It should also be appreciated that travel data may be transmitted to the server device from a plurality of different client devices (e.g., mobile devices 12, 60, 62, 64). For example, the server device may be configured to collect travel data from a large number of client devices using known crowdsourcing methodologies. As such, the server device may be able to quickly and efficiently collect travel data associated with a large network of roads.

Referring still to FIG. 2, at 112, the road quality of a particular road(s) may be assessed by analyzing the travel data received from the client device. Specifically, as indicated above, the travel data may be filtered and/or weighted by the client device based on the confidence score. Thereafter, the resulting data that is transmitted to the server device may be analyzed to identify road surface anomalies based on the acceleration transients present in the acceleration data. The location of each identified anomaly may be stored within the server device and subsequently shared with one or more client devices (e.g., at 114). For example, as indicated above, the identified anomalies may be used within a mapping or other GIS application to provide smoother driving routes and/or provide a user notice of upcoming anomalies.

It should be appreciated that, in alternative embodiments, method elements 104 and 106 may be performed by the server device. In such embodiments, upon the collection of the travel data by the client device (e.g., at 102), the travel data may be transmitted to the server device so that it may be analyzed based on the heuristics to determine the confidence score associated with the data. Thereafter, the travel data (as filtered and/or weighted by the server device based on its confidence score) may then be used to assess the road quality of a particular road(s).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer implemented method for assessing road quality using data collected form a mobile device, the method comprising:

obtaining, by one or more processors, travel data collected by the mobile device during a mobile device traversal, the travel data including acceleration data associated with the mobile device during the mobile device traversal;

analyzing, by the one or more processors, the travel data according to one or more heuristics, each heuristic providing a heuristic metric indicative of whether the mobile device traversal is a human-carried mobile device traversal;

determining, by the one or more processors, a confidence score for the travel data based on the heuristic metric provided by each of the one or more heuristics;

processing, by the one or more processors, the travel data to assess road quality for a section of a road based at least in part on the confidence score, including discarding the travel data when the confidence score does not exceed a confidence threshold; and providing, by the one or more processors, an indication of road quality for the section of the road to a user approaching the road segment.

2. The method of claim 1, wherein the travel data further includes position data associated with the mobile device during the mobile device traversal.

3. The method of claim 1, wherein analyzing the travel data according to one or more heuristics comprises analyzing the travel data according to a speed heuristic.

4. The method of claim 3, further comprising:

determining a speed of the mobile device during the mobile device traversal based the travel data; and determining the heuristic metric based on the speed of the mobile device.

5. The method of claim 1, wherein analyzing the travel data according to one or more heuristics comprises analyzing the travel data according to an endurance heuristic.

6. The method of claim 5, further comprising:

determining a speed of the mobile device during the mobile device traversal based on the travel data;

identifying a time period across which the speed is maintained during the mobile device traversal; and determining the heuristic metric based on the time period.

7. The method of claim 1, wherein analyzing the travel data according to one or more heuristics comprises analyzing the travel data according to a frequency heuristic.

8. The method of claim 7, further comprising:

analyzing the acceleration data to identify a plurality of acceleration transients;

determining a frequency of the acceleration transients; and generating the heuristic metric based on the frequency.

9. The method of claim 1, wherein analyzing the travel data according to one or more heuristics comprises analyzing the travel data according to an acceleration heuristic.

10. The method of claim 1, further comprising:

determining an acceleration of the mobile device during the mobile device traversal based on the acceleration data; and determining the heuristic metric based on the acceleration of the mobile device.

11. The method of claim 1, wherein the heuristic metric is generated based on a monotonically increasing function.

12. The method of claim 1, wherein the confidence score is determined based on the heuristic metric provided by each of the one or more heuristics using fuzzy logic.

13. The method of claim 1, wherein processing the travel data to assess the road quality includes identifying at least one surface anomaly.

14. The method of claim 1, further comprising obtaining further travel data collected by a plurality of mobile devices to identify road surface anomalies using a crowdsourcing methodology.

15. A system for assessing road quality using data collected form a mobile device, the system comprising:

a computing device including a processor and memory, the memory storing instructions that, when executed by the processor, configure the computing device to:

obtain travel data collected by the mobile device during a mobile device traversal, the travel data including acceleration data associated with the mobile device during the mobile device traversal;

analyze the travel data according to one or more heuristics, each heuristic providing a heuristic metric indicative of whether the mobile device traversal is a human-carried mobile device traversal;

determine a confidence score for the travel data based on the heuristic metric provided by each of the one or more heuristics;

process the travel data to assess road quality based at least in part on the confidence score, including discard the travel data when the confidence score does not exceed a confidence threshold; and using the assessed road quality, generate a driving route with a least amount of road surface anomalies to a user-selected travel destination.

16. The system of claim 15, wherein the travel data further includes position data associated with the mobile device during the mobile device traversal.

17. The system of claim 15, wherein the computing device is configured to analyze the travel data according to at least one of a speed heuristic, an endurance heuristic, or a frequency heuristic.

18. The system of claim 15, wherein the heuristic metric is generated based on a monotonically increasing function.

19. The system of claim 15, wherein the confidence score is determined based on the heuristic metric provided by each of the one or more heuristics using fuzzy logic.

20. The system of claim 15, wherein the computing device is configured to analyze the acceleration data to identify a plurality of acceleration transients associated with the road surface anomalies.

* * * * *